Sept. 29, 1942.    A. P. LEE    2,297,004
DISTILLATION OF ORGANIC LIQUIDS
Filed Dec. 1, 1938    2 Sheets-Sheet 1

INVENTOR
Alan Porter Lee
BY
Howard Freeman
    ATTORNEY

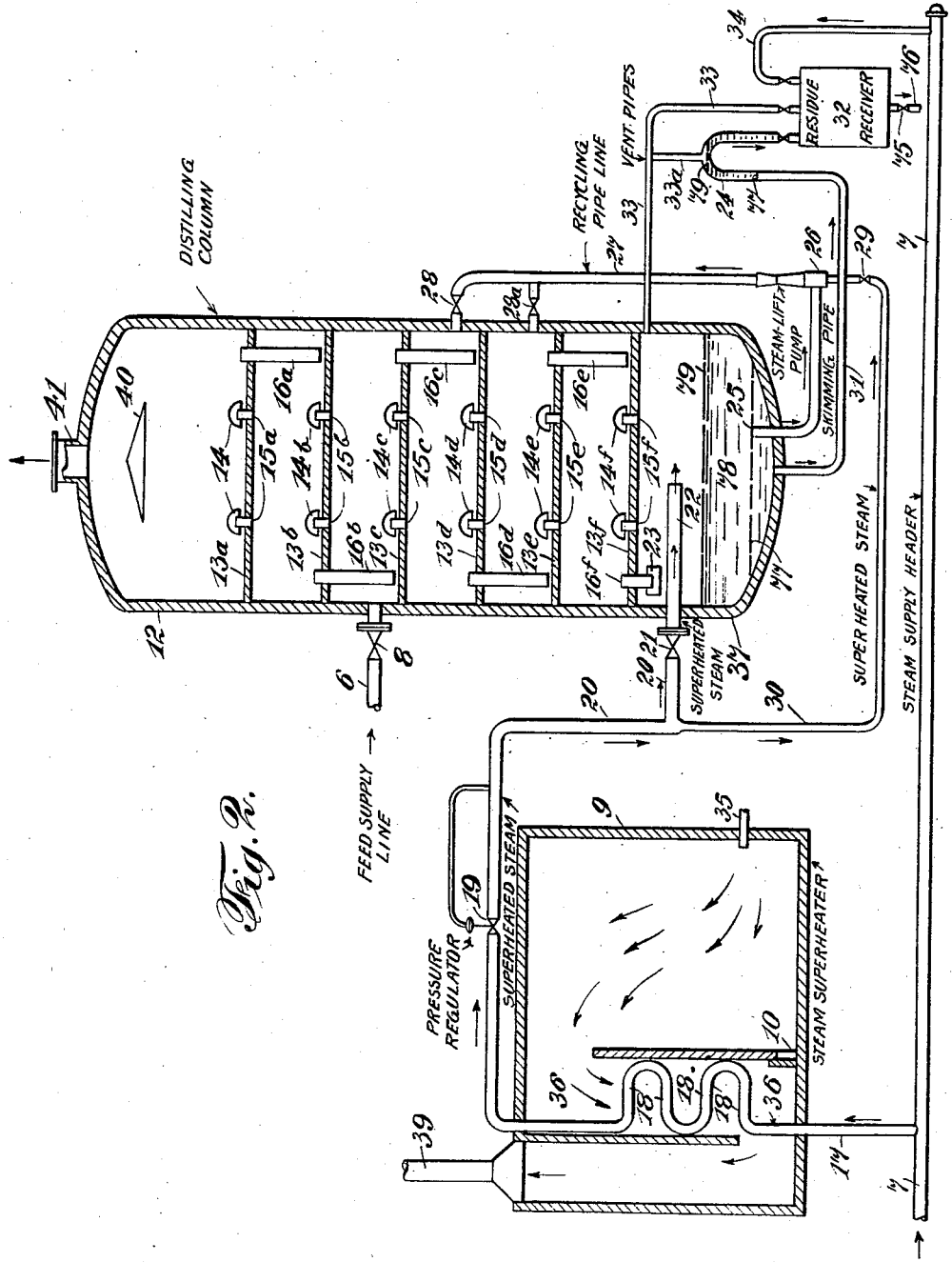

Patented Sept. 29, 1942

2,297,004

UNITED STATES PATENT OFFICE 2,297,004

DISTILLATION OF ORGANIC LIQUIDS

Alan Porter Lee, Madison, N. J.

Application December 1, 1938, Serial No. 243,307

8 Claims. (Cl. 202—46)

This invention relates to improvements in methods of distilling organic liquids in column stills and particularly to improvements in the procedure of returning undistilled residues to the distilling zone, known as "recycling," in the distillation of organic liquids. Examples of such liquids are fatty acids—the products of hydrolysis of tallows, greases, fatty oils, soapstocks and similar products; fatty oil stocks containing fatty acids which are to be separated by distillation; petroleum derivatives or fractions of various boiling points, particularly lubricant stocks, residues from cracking stills, fuel oil stocks, asphalts and other high-boiling fractions of petroleum oils; glycerine; benzene and liquid derivatives thereof; organic esters; tars; waxes and the like.

It is an object of this invention to provide, for use in connection with the distillation of such products, a method of recycling residues which will facilitate increased efficiency of separation of the distillates from the residues.

Another object of the invention is to provide an economical method of reheating the recycled residues in order to promote additional recovery of distilled product from said residues.

Another object of my invention is to provide an economical method of supplying heat to the intermediate and upper portions of the distilling column.

A further object of my invention is to provide means and a method of continuous selective separation of distillation residues, returning to the distilling column a portion of the residue containing economically recoverable distillable material, while discharging away from the distilling column another portion of the residue from which such economically distillable material has been recovered.

This application is a continuation in part of my United States Letters Patent 2,177,664, issued October 31, 1939.

The above-mentioned objects and other objects of this invention will be fully understood from the accompanying drawings, which diagrammatically show preferred embodiments of my invention. It is to be understood that the example herein described is by way of illustration only and not of limitation and that it may be applied to all other embodiments within the scope of this invention, as will be hereinafter fully disclosed.

The example given describes the operation of my invention in conjunction with the process of vacuum distillation of mixed fatty acids, but it is to be understood that my invention is applicable to recycling distillation residues in the distillation of other organic liquids and is not limited to the recycling of residues in fatty acid distillation.

It is well known that almost any distilling column can be reduced in overall height and the number of trays reduced (in tray-containing columns) by recycling a portion of the distillation residues from the bottom to an intermediate portion of the column (below the feed inlet) for redistillation and the recovery of additional distillable material from such recycled residues.

One ordinary method of recycling the residues involves use of a mechanically operated force pump to withdraw the residues from the bottom of the column and force them to the desired point of re-entry to the column.

Another method, applicable only when the residues are very light in specific gravity and low in viscosity and where the pressure drop through the distilling column is high, is based upon use of this pressure differential to cause upward flow of the residues to the point of re-entry to the column.

In the distillation of fatty acids, heavy lubricant stocks, fuel oil stocks, asphalts, tars, waxes and similar heavy, viscous materials, the residues are of such heavy or tarry nature, even at the elevated temperature of the still, that recirculation by ordinary means becomes difficult and often impossible. In addition, such residues tend to cool rapidly, becoming on cooling very much more viscous.

In my invention I utilize a steam-lift pump operated by superheated steam at a temperature considerably above that of the distillation residues to withdraw such residues from a lower portion of the distillation column and return them to an intermediate portion of said column for further distillation of recoverable distillate from said residues.

In passing through the steam-lift pump, the recirculating residues are intimately admixed with the superheated steam which is used as the actuating force of the pump and said residues are thereby reheated for promotion of further distillation from them.

This superheated steam enters the distilling column with the recycled residues and becomes useful in the intermediate and upper portions of the distilling column in promoting vaporization of distillable material and in supplying heat which is useful in distillation in replacing heat lost by radiation from the said intermediate and upper portions of the column.

My invention provides means and a method of selecting for continuous return to the distilling column for redistillation that portion of the distillation residues which contains a large proportion of distillable substances, while continuously withdrawing from the distillation zone that remaining portion of said residues which contains a lower proportion of such distillable substances.

This is accomplished, as will be explained fully herein, by suitable arrangement of the suction connection for withdrawal from the distilling column of redistillable residues by the recirculating steam-lift pump, in relation to a controlled outflow arrangement adapted to withdrawal from the distilling column and complete discharge outside the system of that portion of the residues which is not economically redistillable.

The accompanying drawings are presented in illustration of equipment assemblies suitable for use in application of my invention to recycling the residues of the distillation of organic liquids, such as, for example, mixed fatty acids, but are not intended to be construed as limiting the claims appended hereto to execution by means of the equipment specifically illustrated in said drawings, various modifications of said equipment being permissible within the scope of my invention.

In order that my invention may be clearly understood, I refer to the drawings herewith, in which:

Figure 2 is an enlarged detail, partly in section, of one form of the assembly of a distilling column with steam-lift pump residue reheater and recirculator, with equipment for continuous controlled removal of a portion of the residues and with steam superheater.

Figure 1:
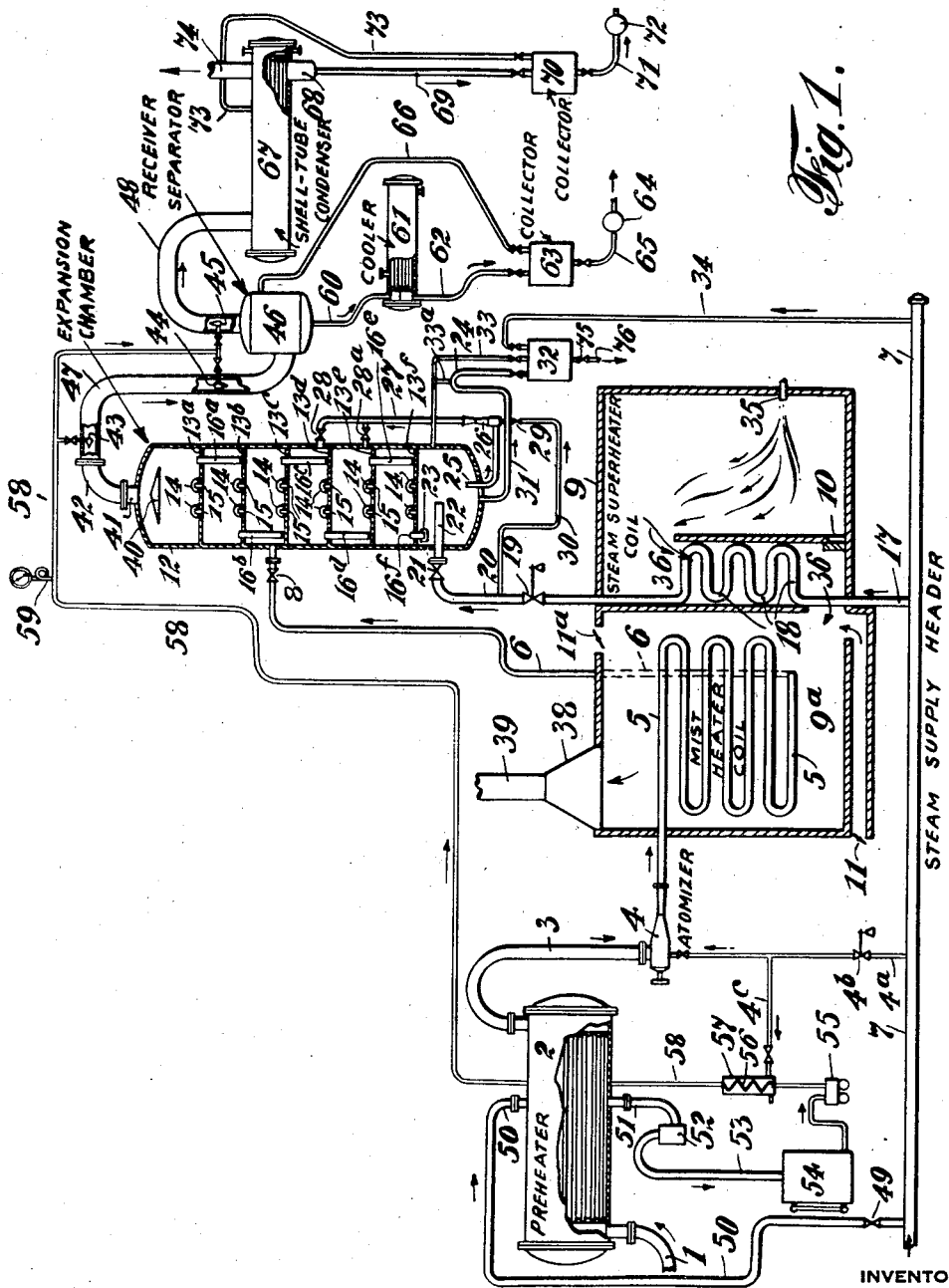
Figure 1 is an elevation, partly in section, of suitable apparatus in one form of design.

Referring to Figure 1, which is an elevation, partly in section, of suitable apparatus for operation of my invention, pipe line 1 is the charging line through which the mixture of fatty acids or fatty-acid-containing stock is fed to the apparatus by gravity or by other suitable means. In the usual operation of commercial fatty acid distillation the stock fed may contain from 90% to 98% of mixed fatty acids, the remainder consisting of neutral fat, unsaponifiable material and traces of moisture. The material fed into the system through charging line 1 may be at any suitable temperature for its pipe line flow, varying from room temperature for liquid fatty acids to 150°–175° F. for higher melting mixtures. The stock to be distilled is fed thus through pipeline 1 into and through the shell-and-tube heat exchanger 2, where it is heated by means of any suitable hot fluid, preferably steam, to any convenient temperature of initial heat or preheat, such as 225° to 300° F., and preferably not over 275° F., for avoidance of local overheating and consequent decomposition. The temperature of the heating fluid may be from 300° to 375° F. or lower, but not substantially higher.

From the preheater 2 the stock to be distilled passes through the pipeline 3 to the atomizer 4, where it is thoroughly mixed, atomized and sprayed with from five to fifty or more times its own volume of steam. The effect of this atomization is to break up the solid stream of flowing liquid into a mist or spray of dissociated liquid particles or droplets, each being fully surrounded and encased by a protective atmosphere of steam. In this mixture the steam forms a continuous phase and the stock a discontinuous phase consisting of a plurality of separate particles. The possibility of formation of any film of liquid on the interior surfaces of the tubes 5, 5 in the heater 5, through which the mixture next passes is thus avoided. In this manner any local overheating, decomposition, charring, or carbonization, is prevented. The atomization with steam also increases the velocity of flow and the turbulence of the atomized mist, thus contributing further to the avoidance of film formation in the tubes of the heater.

The atomization of the stock with steam may be accomplished by any suitable means, such as a steam ejector, revolving vanes, spray nozzles, mixing valve, burner-type atomizer or any suitable combination of such means. In the process herein described the atomizing means consists of a steam-ejector-type mixing valve as shown at 4 in Figure 1. The volume of steam being many times that of stock, the resultant mixture consists of many particles of stock surrounded by an atmosphere of steam. Other suitable means of atomization may be substituted for that shown.

For the steam used for atomization, any inert gas, such as nitrogen, might be substituted, in which case the atomizing gas would preferably be preheated to a temperature equal to or slightly higher than that of the stock to be atomized. When steam is used it may be saturated or slightly superheated steam.

The atomized mixture of stock and steam passes through the heating tubes 5, 5 of the mist heater coil, being heated therein by direct contact on the outer walls of the tubes of the gases of combustion of suitable fuel, as for example, natural gas, fuel oil or coal. In one application of my invention, waste gases which have previously been utilized for superheating steam are employed to heat the mixture of steam and fatty acids passing through the tubes 5, 5, means being provided to control the temperature of the gases when contacting the tubes 5, 5, raising this temperature by admission through bypass 10 (shown in closed position) of some gases not previously utilized and lowering it by admission of air through the tempering damper or dampers, 11 and 11a. Suitable temperature of gases entering the stock-steam heater pass 9a have been found to be between 650° and 950° F., preferably 850° F.

The atomized mixture of steam and stock is heated very rapidly while passing through the tubes 5, 5 of the pass 9a, a convenient rate being about 800° F. per minute, the heating being carried to a point below the vaporization temperature of the stock under the pressure conditions of the heater, but considerably above the vaporization temperature of the same stock under the subatmospheric pressure conditions which it next encounters in the distillation or flashing chamber 12. Suitable maximum temperatures for the atomized stock and steam mixture when distilling fatty acids are from 400° to 600° F. and preferably 475° to 525° F., although depending in some measure upon the composition of the stock and the absolute pressure conditions in the distilling apparatus. After being heated in the tubes 5, 5, where the pressure is maintained at an average of 8 lbs. per square inch gauge or less, the mixture of stock and steam passes through the pipe 6 and the control valve 8 into the distillation chamber 12, which is maintained under relatively low subatmospheric pressure, from 1″ to 10″ mercury absolute, and preferably about 2″ absolute in its upper portion, although the operation may be performed at other pressures, depending upon the amount of distillation steam employed. The distillation chamber may take any well-known form, as, for example, a plain cylinder, a tower packed with material for increasing evaporative surface, a screen-baffle tower or a bubble-cap tray tower. In this instance the chamber is shown as a bubble-cap plate tower 12, having several plates 13, 13, each plate being equipped with a plurality of bubble-caps 14, 14 and vapor chimneys 15, 15. Each plate is equipped also with an overflow pipe 16.

When the atomized mixture of steam and stock enters the vacuum chamber 12 through the valve 8, the steam expands, and the stock, being above its volatilization temperature for the pressure conditions of the vacuum chamber, commences to volatilize rapidly. Both these conditions cause considerable drop in temperature in the stock, which drop amounts in practice to 40° to 90° F.

In the instance shown the stock and steam mixture is introduced just above the lowest upper tray 13c of the bubble tower. The steam and the immediately vaporized fatty acids rise in the tower toward the next tray above, while that part of the stock which remains unvaporized falls toward the tray 13c. The mixed vapors pass through the chimneys and caps in the next upper tray 13b and much of the vaporized fatty acids is condensed, forming on the tray a pool of fatty acids of considerably purer quality than the original stock. The depth of this pool is controlled by the overflow pipe 16b, which carries to the next lower tray all condensation in excess of the amount necessary to maintain a shallow pool on the upper tray 13b. The unvaporized stock likewise forms a pool on the first tray 13c below the feed inlet.

Steam at boiler pressure, in this case 145 lbs. per square inch (temperature 363° F.) is taken from the steam header 7 through the pipe 17 and superheated in the pipe coil 18 in furnace 9 to final temperature of 900° to 1000° F. In passing through the pressure reducing and regulating valve 19, its pressure is reduced to 3-10 lbs. per square inch gauge and its temperature falls to 750°-900° F., normally 850° F. Any suitable fuel is burned at the burner 35 in furnace 9, the gases of combustion passing over the steam superheating coil 18 in space 36, then through pass 9a over the heating tubes 5, 5 through which latter tubes is passed the atomized stock-steam mixture which is to be distilled, the gases passing finally out through the breeching 38 and the stack 39. Control of temperature of the gases passing over the tubes 5, 5 is secured by means of the hot-gas bypass damper 10 and the tempering dampers 11 and 11a.

The reduced-pressure superheated steam is conducted through pipe 20, control valve 21 and nozzle 22 to the center of the tower 12 at a point just below the bottom bubble-cap plate 13f. This superheated steam serves two purposes, first, to aid distillation of the fatty acids and second, to supply heat to replace that consumed in evaporation of the stock and in radiation from the apparatus.

As the steam expands through the control valve 21 out of the supply pipe zone of pressure of 3 to 10 lbs. per square inch gauge, into the bottom area of the tower at pressure of 2½" to 3" of mercury absolute, there is marked cooling of the steam due to expansion, which enables regulation of the temperature of this bottom area at between 575° and 650° F., when using steam at temperatures between 800° and 900° F. before expansion into the tower.

When the pool of unvaporized stock on the tray 13c below the stock-steam inlet pipe becomes of depth just greater than the projection above the tray of the top of the overflow pipe 16c, the surplus stock overflows to the next lower tray 13d, where it forms a new pool of material lower in fatty acid content than the original stock. In similar manner pools are formed on each succeeding tray below the point where the atomized stock-steam mixture enters the tower.

As the superheated steam entering the bottom of the tower expands, rises through the bubble-cap chimneys and is distributed by the bubble-caps through the pool of material on the lowest tray, the bulk of the fatty acids remaining in this material will be vaporized, with the aid of the partial pressure of the superheated steam. The mixed steam and distillate vapors will rise through the chimneys of the next higher tray and be distributed through the pool of material on that tray. Here portions of the distillate vapors will condense, giving off their heat of condensation to cause evaporation (with the aid of the partial pressure of the steam) of further quantities of vaporizable material from the pool on that tray.

This process of condensation and evaporation is repeated on each succeeding bubble tray from bottom to top of the tower, the rising vapor mixture becoming progressively richer in distillate vapors as the top tray is approached and the descending unvaporized stock becoming progressively poorer in vaporizable material as it approaches the bottom tray.

The rising mixed vapors of superheated steam and distillate become progressively cooler as they pass upward through the tower, from the effects of expansion, evaporation and radiation. The descending stream of liquid material likewise tends to become progressively cooler in descending through the tower, from the effects of evaporation and radiation. As the operation progresses, this tendency of the descending stock to become cooler is overcome, in part by the heating effect of partial condensation of distillate vapors in the pool of liquid on each tray and partly by the heat supplied by the superheated steam, so that when the operation reaches the desired state of continuous equilibrium, the descending liquid stock increases in temperature on each succeeding lower tray, while the ascending vapors decrease in temperature as they rise through the tower. The liquid residue flowing away from the bottom tray 13f, in fatty acid distillation is at a temperature of 505° to 595° F. and preferably 580° F. when distilling standard mixed fatty acids from tallow grease. It is to be noted that for best results, this temperature of material leaving the bottom tray may suitably be varied over a wide range, depending upon the type of material treated. For certain fatty acids of vegetable origin, this bottom tray temperature suitably may be carried as low as 400° F., or even lower.

The residue flows from the bottom plate through the overflow pipe 16f into the cup seal 23, out of which it falls to a sump at the bottom of the tower, forming there a pool, the depth of which is controlled by the inverted syphon pipe-loop 24.

In my invention I utilize a steam-lift pump operated by superheated steam at a temperature considerably above that of the residues to draw such residues from the bottom of the vacuum chamber 12 through the skimming pipe 25 and the steam-lift pump 26, discharging through the discharge pipe 27 and the valve 28 into the distillation chamber at a point above the third tray from bottom, 13d, or alternatively to the next lower tray 13e through the valve 28a, or through both these valves to both the trays simultaneously. Superheated steam at 3 to 10 lbs. pressure and temperature of about 850° F. is taken from the pipe-line 20 through the valve 29 and the pipe 30 for operation of the steam-lift pump 26.

The use of the steam-lift pump operated by superheated steam has several advantages. The temperature of the residues is raised, thus aiding further distillation of vaporizable material from these residues. The superheated steam used for the steam-lift pump mixes with the residues and its vapor pressure is utilizable in the distillation from the trays above the point of its entrance into the tower. The addition of the extra heat units of this superheated steam is useful in economical replacement of heat lost by radiation from the central and upper portions of the tower and in maintenance of vaporizing temperatures on the upper plates.

Despite the admixture of steam with the residues and the injection of this mixture into the median portion of the distilling zone, in my process no entrainment of coloring matter from the residues is apparent in the distilled fatty acid vapors leaving the upper exit of the tower.

By variation of the volume of superheated steam fed to the steam-lift pump, the quality and amount of final residue can be controlled, the amount recirculated controlling the net amount of final residue outflow. As the amount of material recirculated is increased, the amount of distillation steam added to the tower through the supply pipe nozzle 22 likewise must be increased, to provide for the increasing distillation burden on the lower trays. The amount of steam utilized by the recycling steam-lift pump, however, is also used as distillation steam and does not increase the total steam input which would be required to obtain comparable distillation results in similar apparatus without this feature.

The heavier residues, sinking to the lowest point of the pool formed in the sump 37 at the tower bottom and comprising all surplus which is not recycled by the steam-lift pump 26, flow through the pipe 31 and inverted syphon 24 into the pitch receiver 32, which is connected to the tower 12 by the vacuum-vent pipes 33 and 33a. The pitch receiver is shut off intermittently from the vacuum tower and, by means of steam pressure through the line 34 from the header 7, the pitch is discharged from the receiver 32 to storage, through valve 75 and pipe 76. When the pitch receiver is being discharged, the residues are permitted to accumulate further in the sump 37 of the tower 12, to the extent of surplus above the amount being recirculated, without deleterious effect upon the color of the distillate. In fact, after the continuous operation of the distilling apparatus has become stabilized, a pool of residue is maintained in the sump 37 of the tower 12, to the depth permitted by the height of the inverted syphon loop 24. This pool is heated by the superheated steam issuing from the nozzle 22 just above the pool and is also heated by the metal of the tower bottom, which in turn, derives its heat from the superheated steam. In operation the temperature of the residue pool is maintained at from 15° to 50° above that of the partially finished stock on the bottom tray 13f.

The vapors of pure fatty acids or other distilled material, which are volatilized from the upper tray, 13a, of the flashing chamber, by heat from the condensation of less pure vapors in the pool of liquid on that tray, and which are mixed with vapors of superheated steam, may be freed of entrained liquid by any well-known means (such as the baffle-plate 40 in this instance), and then condensed, also by any means well-known to those skilled in the arts of distillation; the final residual water vapors, which contain traces of distillate, being condensed in the vacuum producing apparatus or allowed to escape to the atmosphere (in atmospheric pressure adaptations of my process).

As stated above, the pure distillate vapors mixed with superheated steam rise from the top tray 13a of the distillation chamber 12 (Figure 1). The mixed vapors travel through the annular space surrounding the entrainment baffle 40, pass above the baffle and out of the distillation chamber through the vapor nozzle 41 and the elbow 42. Exit vapor temperature for fatty acids may be 375° to 475° F. (preferably 415° F. for the mixed fatty acids of tallow greases).

In applying the well-known water spray condensation system at points 43 and or 44, 45, it was found that the distillate recovered in the receiver-separator 46 was small in quantity and contained appreciable amounts of free liquid water as well as some emulsified water. I overcome these objections entirely by heating the water used in the condensing sprays nearly to its boiling point at atmospheric pressure. This heated water is conveyed under positive pressure to the condensing spray-heads and when released through these spray-heads into the reduced pressure zone of the vapor pipes 47 and 48, all of the water is completely vaporized, absorbing the heat necessary for its vaporization from the mixed distillate and superheated steam vapors coming from the tower 12. This absorption of heat causes the bulk of the distillate vapors to condense as liquid, entirely free of any liquid water. This liquid condensate may be collected in the receiver-separator 46.

Steam at 145 lbs. gauge pressure is taken from the main steam header 7 (Figure 1) through the valve 49 and the pipeline 50 to the steam space of the preheater 2 where it is utilized to preheat the charging stock of the still by means of heat-exchange. The steam condenses in the preheater and the condensate water is automatically removed through the pipeline 51 by the steam trap 52, discharging through the pipeline 53 into the reservoir 54. The pure condensed water is pumped by the pump 55 through the heating coil 56 in the heat exchanger 57 and on through the pipeline 58 to the spray nozzles at 43, 44 and 45. These nozzles may be utilized in any suitable manner, each being controlled by a valve. Steam, water or any suitable fluid may be used as the heating medium for the pure water passing through the coil 56. In the example shown, steam at 145 lbs. gauge pressure is taken from the steam main 7 through the pipeline 4a and reduced to 15 to 20 lbs. gauge pressure by means of the pressure-reducing and regulating valve 4b. A portion of this steam is utilized for atomization of the charging stock in the steam-atomizer 4 and another portion passes to the heat exchanger 57 through the pipeline 4c. In the heat exchanger 57, this steam is used to heat the water passing through the coil 56. This water is heated to 180° to 205° F. and preferably as high as possible without substantial vaporization in the coil 56 or the pipeline 58. Operation of the pump 55 is so controlled that a pressure of from 6 to 12 lbs., normally 8 lbs. gauge is maintained in the spray water supply pipe 58 at the gauge point 59 close to the spray-nozzle locations.

The spray condensing system may be combined with any suitable collecting system for recovery of the condensed distillate. In the example shown (Figure 1), the mixed vapors of steam and distillate entering the outlet pipe 41 at 415° to 430° F., are cooled to 325° to 365° normally 350° F.) by means of the hot-water sprays 43, 44 and 45. Passing through the vapor pipe 47 into the receiver-separator 46, the bulk of the distillate vapors separates out as liquid fatty acids in the receiver-separator, from which the liquid condensate flows by gravity through the pipeline 60, the shell-and-tube cooler 61 and the pipe 62 to the collector 63. In passing through the shell-and-tube cooler 61, the liquid condensate is cooled to 125° to 175° (normally 135° F.) by means of water or other cooling fluid and collected in a pure moisture-free state in the collector 63. From this container it may be pumped continuously by means of the pump 64 and the pipe 65 to a receiving and storage tank (not shown). The collector 63 is joined to the receiver-separator 46 by the additional vacuum-vent pipe 66.

After collection of the bulk of the condensed distillate in the receiver-separator 46, the residual water vapors, containing a small percentage of uncondensed distillate vapors, pass through the vapor pipe 48 to the shell-and-tube condenser 67, where the vapor stream is further cooled to 105° to 140° F. (normally 120° F.), by heat exchange with water or other suitable cooling fluid. Here the remaining distillate vapors are condensed, the liquid condensate collecting in the hot-well receiver 68 and flowing by gravity through the pipe 69 to the second collector 70, from which this condensate is pumped continuously through the pipe 71 by means of the pump 72 to a receiving and storage tank (not shown). The second collector 70 is connected to the shell-and-tube condenser 67 by a vacuum-vent pipe 73 in addition to the pipe 69. The distillate condensed in the shell-and-tube condenser and collected in the second collector 70 generally contains small quantities of liquid water, but the total of this condensate is a very small fraction of the total from the still, the bulk of the distillate vapors being condensed by the spray condensing system.

The final water vapor, practically free of distillate (vapor or liquid) leaves the shell-and-tube condenser 67 by the vapor pipe 74, passing to standard vacuum apparatus of any suitable type (not shown).

Referring to Figure 2, which is an enlarged detail, partly in section, of one form of assembly of a distilling column with suitable apparatus for operation of my invention, 12 is any suitable distilling column into which the previously heated material to be distilled in introduced through the pipe 6 and the valve 8. As shown, the column 12 is a bubble-tray column equipped with trays 13a, 13b, 13c, 13d, 13e and 13f, multiple bubble caps 14 (a to f), vapor chimneys 15 (a to f) under each bubble cap, overflow or downflow pipes 16 (a to f), entrainment baffle 40, vapor outlet 41, steam-supply nozzle 22 and overflow cup-seal 23.

As described hereinbefore, the material to be distilled enters the distilling column 12 through the valve 8 in the pipe 6 and is vaporized in the column. The vapors of distilled material rise in the column and the unvolatilized portions of the feed stock descend through the tower from tray to tray toward the bottom by means of the overflow pipes 16a, 16b, 16c and so on, forming a shallow pool of liquid material of varying composition on each tray in the course of the descent of said unvaporized portions of the feed stock.

During the distillation operation, superheated steam is supplied to the column through the pipe 20, the throttling valve 21 and the nozzle 22. This superheated steam on entering the column expands to fill the entire free space therein below the tray 13f, rises through the vapor chimneys 15f in that tray and bubbles into the shallow pool of liquid on the tray, serving there to heat said pool of liquid and by means of said heating, also in part by means of the vapor pressure of said steam, to cause vaporization of an appreciable amount of distillable material from said pool. The mixed vapors of steam and of said vaporized distillable material then pass upward through the vapor chimneys 15e in the next tray 13e above, thence through the outlets of the bubble caps 14e into the shallow pool of liquid on the tray 13e. Here substantial portions of the vapors of material vaporized from the lower tray 13f are condensed, releasing their latent heat of condensation, which serves, with the aid of the superheated steam vapors, to cause volatilization of distillable material from the pool on the tray 13e.

This process is repeated on each successive tray in turn as the vapors rise through the column. Thus, as the stock to be distilled descends from tray to tray through the overflow pipes 16a to 16f, its content of distillable material is progressively reduced.

From the tray 13f the residual stock, which still contains a considerable amount of economically distillable material, flows through the overflow pipe 16f into the cup-seal 23, thence into the bottom space 37 of the distillation column 12.

This bottom space of the column is in free communication with the residue receiver 32 through the outlet pipe 31 and the inverted syphon pipe-loop 24, also through the vent pipes 33 and 33a.

The distillation residues descending into the lower portion of the column 12 flow through the outlet pipe 31 and rise toward the pipe-loop 24 until the ascending portion of the said outlet pipe 31 is filled to a level 77 corresponding to the level of the intake of the skimming pipe 25.

Steam at boiler pressure is taken from the main steam header 7 through the pipe 17, is superheated in the coil 18 of the furnace 9 and is reduced in pressure at the pressure-regulating valve 19. This steam then passes through the pipe 20, and a portion of it through the valve 21 and the steam-supply nozzle 22 into the lower portion of the distilling column 12, where is serves to supply heat and vapor pressure to the distilling column. Another portion of the superheated steam flows through the pipe 30 and the valve 29 to the steam-lift pipe 26, in passing through which it exerts suction on the skimming pipe 25.

When the pool of distillation residue in the lower portion of the column 12 reaches the intake level 77 of the skimming pipe 25, the suction of the superheated steam passing through the steam-lift pump 26 draws into said pump surplus distillation residues above the amount necessary to maintain in the lower portion of the distillation column 12 a shallow pool with its upper surface substantially level with the intake of the skimming pipe 25. In the steam-lift pump 26 the superheated steam mixes directly and intimately with the residues withdrawn from the column 12 through the skimming pipe 25, and the steam, having been superheated to a temperature higher than that of said withdrawn residues, serves to reheat said residues and at the same time to elevate them through the pipe 27 and to return them to the column 12 through the valve 28, or the valve 28a, or in part through each of said valves, as desired.

The residues thus returned to the distilling column then mix, on the tray 14d or the tray 14e, or in part on each of these trays, with the undistilled material descending through the column. In this manner the said residues are reheated by the superheated steam in the steam-lift pump and are subjected to further distillation effect when returned to the column, additional quantities of vaporizable material being thus removed from the residues.

When the mixture of superheated steam and reheated distillation residues enters the distilling column 12 through the valve or valves 28 and 28a, the superheated steam expands and rises through the vapor chimneys 15 (d to a) and bubble caps 14 (d to a) of the upper trays 13 (d to a) and imparts to the pools of liquid on those trays additional heat and vapor pressure, thus contributing to distillation of vaporizable material from said pools and to the maintenance of distillation temperatures therein.

The volume of distillation residues descending from the tray 13f through the pipe 16f and the cup-seal 23 into the lower portion or sump 37 of the distilling column 12 may be continuously increased by increasing the amount of superheated steam admitted to the steam-lift pump 26 (thereby increasing the volume of residues recycled to the distilling column).

As the volume of distillation residues descending from the tray 13f into the lower portion of the distilling column increases it tends to exceed the amount recirculated and the pool 78 of liquid residues in the lower portion of the column gradually increases in depth until it reaches the level 79 corresponding to the overflow point of the vented pipe-loop 24. When this condition is reached the contents of the residue pool 78 start to discharge gradually through the pipe 31 and the loop 24 into the residue receiver 32.

Because of the withdrawal of quantities of residue by the steam-lift pump 26 through the skimming pipe 25, only the heaviest portions of said residue, that is, those portions containing a low proportion of distillable material, sink into that portion of the pool 78 which is below the level 77 and these heaviest portions of the residue flow thence through the pipe 31 and the vented pipe-loop 24 to the residue receiver 32. In addition, under the conditions of high temperature and low absolute pressure existing in the lower portion of the distilling column, there is some vaporization of distillable material from that portion of the pool of residues 78 which is above the intake of the skimming pipe 25.

This vaporization of distillable material from the upper portion of the residue pool is an additional favorable factor in substantial reduction of the amount of distillable material contained in the final residue portion which flows to the residue receiver 32 through the pipe 31 and the vented pipe-loop 24.

The residue receiver 32 is discharged intermittently through the valve 75 and the pipe 76, by admission to the receiver of steam pressure through the pipe 34, valves on the lines 24 and 33 being closed at such times. During such intermittent discharge of the contents of the receiver 32 the residue pool 78 may increase slightly in volume, but recycling and reheating of residues by means of superheated steam in the steam-lift pump 26 is not interrupted and when the valves on lines 24 and 33 are re-opened, the level of the residue pool is automatically readjusted to the height 79.

Substantially in the manner hereinabove described the residues in a column distillation are recycled with economical reheating of such recycled residues; promoting increased efficiency of separation of residues and additional recovery of distilled products from said residues; and as a corollary of said reheating, economically supplying additional heat to the intermediate and upper portions of the distilling column, while simultaneously performing a continuous selective separation of distillation residues, reheating and recycling to the distilling column a portion of the residue containing economically recoverable distillable material, while discharging away from the distilling column another portion of the residue from which such distillable material has been recovered.

As an example of operation under the process hereinbefore described, the following distillation has been carried out. The distilling bubble tray column utilized was approximately 15 feet high and 6' 6" in internal diameter at the top (cross-sectional area 33.2 square feet). The tower contained six bubble trays spaced 22" apart, the bottom tray being 30" above the bottom of the tower. The upper tray contained 84 bubble caps, each cap being 5" in external diameter. The total effective distilling area of the upper plate was therefore 21.75 square feet. The top vapor outlet of the tower was 16" internal diameter. Below the vapor outlet a conical-shaped baffle plate 41" in greatest diameter was inserted. The annular space through which all vapors passed between this baffle plate and the upper portion of the tower wall was 28.25 square feet in area.

Steam was admitted to the tower through a 3" pipe below the bottom tray, but above the maximum height of the pool of residue on the bottom of the tower. The material to be distilled, after atomization by steam, was admitted to the heater through two two-inch tubes in parallel and after leaving the heating zone the two portions were combined in one three-inch pipe through which the mist of atomized fatty acids and steam entered the distilling tower in its upper portion. Pressure slightly in excess of atmospheric was maintained in the tubes of the heater.

During a continuous run of 91½ hours, 180,900 pounds of Twitchellized brown grease fatty acids containing 96.2% of free fatty acids (calculated as oleic acid), were fed to the still, or at an average rate of 1977 pounds per hour. 173,390 pounds of distillate were recovered, having color of between 1 and 1½ A. S. T. M., representing a yield of 95.8%. (A. S. T. M. refers to the color standards of the American Society for Testing Materials, which are well-known to those skilled in the art of distillation.)

During this period 3202 lbs. of steam were fed to the charge through the atomizing device, an average of 35 lbs. per hour.

There was added also a total of 86,790 lbs. of superheated steam (an average of 948.5 lbs. per hour), through the three-inch pipe at the bottom of the tower and through the bottoms recirculating steam-lift pump. The stream of fatty acids entered the steam preheater at about 160° F. and was heated therein to temperature of 215° to 230° F. with normal temperature of 225° F. It then passed to the atomizing and steam-mixing valve wherein it was atomized and thoroughly mixed with an average of 35 lbs. of steam per 1977 lbs. of charge, or approximately 29 parts of steam by volume to each part of fatty acid charge.

This atomized mixture of fatty acids and steam entered the mist heater tubes 5, 5 at a temperature of 227° F. and was heated therein to 495° to 530° F. with a normal temperature of 510° F. Passing then to the distilling column through the line 6 and the valve 8, the atomized mixture entered the column above the tray 13c and was cooled by expansion and evaporation so that the temperature of the liquid pool formed on the tray 13c was 425° to 440° F., normally 430° F.

A large portion of the fatty acids was vaporized at once and passed upward as vapor through the distilling column. The unvaporized portion formed a pool on the tray 13c and overflowed therefrom to the lower trays in succession. As the unvaporized residue of the stock descended through the tower, successive additional portions of the fatty acids were vaporized from each tray and the temperature of the residue gradually rose until on the bottom tray (13f) the temperature was 525° F. to 550° F., with normal temperature of 525° F. From this tray the remaining unvaporized residue overflowed into the cup 23 and thence to the bottom of the tower. When the pool of residue so formed in the sump 37 of the tower reached the height of the intake of pipe 25, 4 inches above the bottom of the tower, the lift-pump 26 commenced drawing the residue through the pipe 25, mixing it with superheated steam to reheat it and discharging it above the plate 13d where it joined the stream of unvaporized stock descending through the distilling column. When the total of unvaporized stock descending in the tower became greater than the amount returned by the lift-pump to plate 13d, a pool was formed in the bottom of the tower. The depth of this pool was controlled (by the outlet pipe loop 24) at 13 inches above the bottom of the tower. When the pool started to exceed this depth, all surplus unvaporized residue flowed from the bottom of the pool through the pipe loop 24 into the pitch receiver 32, whence it was discharged intermittently to a storage tank (not shown) by means of steam pressure admitted to the receiver 32 from the pipe-line 34.

By means of the superheated steam entering the distilling column and in the lift-pump 26, the temperature of the recycling stock and of the descending stock in the lower portion of the column was gradually raised until the temperature on the bottom tray became 580° to 610° F., normally 595° F. and the temperature of the pool of residue in the bottom of the tower became 610° to 635° F., normally 615° F.

The vapors rising in the distilling column had an exit temperature of 410° to 430° F., normally 420° F. and were cooled immediately upon leaving the tower, so that the residual vapors leaving the receiver-separator 46 had a temperature of 340° to 367° F., normally 350° F. In the shell-and-tube condenser 67, the vapors were further cooled to an exit temperature of 115° to 140°, normally 125° F., and here substantially the entire remainder of the uncondensed fatty acid vapors was condensed, collecting in the hot-well 68 and flowing to the second collector 70. The condensed fatty acids flowing from the receiver-separator 46 were cooled in the shell-and-tube cooler 61 to 125° to 160° F., normally 135° F. This condensate was free of water. The condensates from both collectors were pumped to a single storage tank, where they were combined in anticipation of further processing or shipment.

During the period of operation 3,365 gallons of condensed water (an average of 36.8 gallons per hour) were pumped from the reservoir 54 by the pump 55 through the heat exchange coil 56, the line 58, and the throttle or pressure-relief valves to the spray-nozzles 43, 44 and 45. The temperature of the water used in the sprays was 198° to 200° F., normally 200° F. The pressure of this water in the supply pipe 58 near the spray-outlets was 3 to 8 lbs. per square inch, normally 6 lbs. per square inch, above atmospheric pressure.

The plant steam pressure utilized was 148 lbs. per square inch gauge with total temperature of 365° F. The superheated steam had pressure of 6.5 lbs. gauge and temperature of 850° F. before entering the bottom of the tower and the lift-pump, variations of pressure being observed between 5 lbs. and 7 lbs. gauge and temperature range from 830° to 880° F. The pressure of steam before entering the atomizing mixer was 18 lbs. gauge, temperature 255° F.

Absolute pressures maintained in the system were as follows:

| | Inches of mercury |
|---|---|
| At the vacuum condenser | 0.5 |
| At the shell-and-tube condenser | 1.0 –1.5 |
| At the receiver-separator | 1.5 –2.0 |
| At the tower top | 1.75–2.25 |
| At the tower bottom | 2.5 –3.0 |

The yield was as follows:

| | Per cent |
|---|---|
| Distillate, 173,390 lbs | 95.8 |
| Pitch, 6,645 lbs | 3.7 |
| Loss, 865 lbs | 0.5 |

My new process may be used likewise in other distillations where it is desired to obtain maximum recovery of distillable material and to reduce the distillation residues to a minimum content of distillable substances. It may be used also for the deodorization and/or purification of fatty oils or mineral oils or other organic liquids containing volatile components. The fatty acids mentioned in the foregoing can be substituted, for instance, by petroleum oils, particularly by lubricant stocks or by asphalt-base crude oils, or by waxes, by tars or by asphalts, without any change of procedure other than those which would be evident from a knowledge of the physical and chemical properties of those materials.

The foregoing detailed description has been given only for clarity of understanding and no unnecessary limitations should be understood therefrom, but the appended claims should be construed as broadly as permissible, in view of the prior art.

What I claim is:

1. In a process for steam distillation of organic liquids yielding tarry or fluid residuums in a tube and chamber distilling apparatus characterized by maintenance of a succession of pools of liquid of composition varying from top to bottom of the distilling chamber, the steps which comprise maintaining in a lower zone of the distilling chamber a liquid body of controlled substantially uniform depth consisting of a mixture of distillation residuum and distillable liquid, continuously withdrawing residuum having minimal content of distillable liquid from a lower zone of said liquid body, continuously withdrawing residuum having substantial content of distillable liquid from an upper zone of said liquid body while maintaining said liquid body at substantially uniform depth, reheating said continuously withdrawn residuum having substantial content of distillable liquid by means of direct admixture with superheated steam of higher temperature than said withdrawn residuum in a steam-lift device communicating through its discharge outlet with a higher zone of said distillating chamber at a point below the point of liquid feed to said chamber having one or more liquid pools of said chamber intervening below said discharge outlet communication and above said liquid body of controlled substantially uniform depth and discharging the resultant mixture of superheated steam and reheated residuum having substantial content of distillable liquid into said higher zone of said distilling chamber.

2. In a process for steam distillation of material containing fatty acids yielding tarry or fluid residuums in a tube and chamber distilling apparatus characterized by maintenance of a succession of pools of liquid of composition varying from top to bottom of the distilling chamber, the steps which comprise maintaining in a lower zone of the distilling chamber a liquid body of controlled substantially uniform depth consisting of a mixture of distillation residuum and distillable fatty acids, continuously withdrawing residuum having minimal content of distillable fatty acids from a lower zone of said liquid body, continuously withdrawing residuum having substantial content of distillable fatty acids from an upper zone of said liquid body while maintaining said liquid body at substantially uniform depth, reheating said continuously withdrawn residuum having substantial content of distillable fatty acids by means of direct admixture with superheated steam of higher temperature than said withdrawn residuum in a steam-lift device communicating through its discharge outlet with a higher zone of said distilling chamber at a point below the point of liquid feed to said chamber having one or more liquid pools of said chamber intervening below said discharge outlet communication and above said liquid body of controlled substantially uniform depth and discharging the resultant mixture of superheated steam and reheated residuum having substantial content of distillable fatty acids into said higher zone of said distilling chamber.

3. In a process for steam distillation of organic liquids yielding tarry or fluid residuums in a tube and chamber distilling apparatus characterized by maintenance of a succession of pools of liquid of composition varying from top to bottom of the distilling chamber, the steps which comprise continuously withdrawing residuum having substantial content of distillable liquid from a lower zone of the distilling chamber, reheating said continuously withdrawn residuum by means of direct admixture with superheated steam of higher temperature than that of said withdrawn residuum and discharging the resultant mixture of superheated steam, residuum and distillable liquid into a higher zone of said distilling chamber at a point below the point of liquid feed to said chamber having one or more pools of liquid intervening below the point of said discharge and above the lower zone of residuum withdrawal of said distilling chamber.

4. In a process for steam distillation of material containing fatty acids yielding tarry or fluid residuums in a tube and chamber distilling apparatus characterized by maintenance of a succession of pools of liquid of composition varying from top to bottom of the distilling chamber, the steps which comprise continuously withdrawing residuum having substantial content of distillable fatty acids from a lower zone of the distilling chamber, reheating said continuously withdrawn residuum by means of direct admixture with superheated steam of higher temperature than that of said withdrawn residuum and discharging the resultant mixture of superheated steam, residuum and distillable fatty acids into a higher zone of said distilling chamber at a point below the point of liquid feed to said chamber having one or more pools of liquid intervening below the point of said discharge and above the lower zone of residuum withdrawal of said distilling chamber.

5. The process of steam distillation of organic liquids yielding tarry or fluid residuums which comprises passing the distillation feed stock through a restricted passage in a heating zone, further passing said feed stock after heating into a distilling zone characterized by maintenance of a succession of pools of liquid of composition varying from top to bottom of said distilling zone, maintaining in a lower portion of said distilling zone a liquid body of controlled substantially uniform depth consisting of a mixture of distillation residuum and distillable liquid, continuously withdrawing residuum having minimal content of distillable liquid from a lower zone of said liquid body, continuously withdrawing residuum having substantial content of distillable liquid from an upper zone of said liquid body while maintaining said liquid body at substantially uniform depth, reheating said continuously withdrawn residuum having substantial content of distillable liquid by direct admixture with superheated steam of higher temperature than said withdrawn residuum in a steam-lift device communicating through its discharge outlet with a higher portion of said distilling zone at a point below the point of liquid feed to said distilling zone having one or more liquid pools of said distilling zone intervening below said discharge outlet communication and above said liquid body of controlled substantially uniform depth, discharging the resultant mixture of superheated steam and reheated residuum having substantial content of distillable liquid into said higher portion of said distilling zone, passing all the vapors of distillation into a condensing zone and condensing and removing the distillate.

6. The process for steam distillation of organic liquids yielding tarry or fluid residuums which comprises passing the distillation feed stock through a restricted passage in a heating zone, further passing said feed stock after heating into a distilling zone characterized by maintenance of a succession of pools of liquid of composition varying from top to bottom of said distilling zone, continuously withdrawing residuum having substantial content of distillable liquid from a lower portion of said distilling zone, reheating said continuously withdrawn residuum having substantial content of distillable liquid by direct admixture with superheated steam of higher temperature than that of said withdrawn residuum, discharging the resultant mixture of superheated steam, residuum and distillable liquid into a higher portion of said distilling zone at a point below the point of liquid feed to said distilling zone having one or more pools of liquid intervening below the point of said discharge and above the point of residuum withdrawal of said distilling zone, passing the vapors of distillation into a condensing zone and condensing and removing the distillate.

7. The process of stem distillation of material containing fatty acids yielding tarry or fluid residuums which comprises passing the distillation feed stock through a restricted passage in a heating zone, further passing said feed stock after heating into a distilling zone characterized by maintenance of a succession of pools of liquid of composition varying from top to bottom of said distilling zone, maintaining in a lower portion of said distilling zone a liquid body of controlled substantially uniform depth consisting of a mixture of distillation residuum and distillable fatty acids, continuously withdrawing residuum having minimal content of distillable fatty acids from a lower zone of said liquid body, continuously withdrawing residuum having substantial content of distillable fatty acids from an upper zone of said liquid body while maintaining said liquid body at substantially uniform depth, reheating said continuously withdrawn residuum having substantial content of distillable fatty acids by direct admixture with superheated steam of higher temperature than said withdrawn residuum in a steam-lift device communicating through its discharge outlet with a higher portion of said distilling zone at a point below the point of liquid feed to said distilling zone having one or more liquid pools of said distilling zone intervening below said discharge outlet communication and above said liquid body of controlled substantially uniform depth, discharging the resultant mixture of superheated steam and reheated residuum having substantial content of distillable fatty acids into said higher portion of said distilling zone, passing all the vapors of distillation into a condensing zone and condensing and removing the distilled fatty acids.

8. The process for steam distillation of material containing fatty acids yielding tarry or fluid residuums which comprises passing the distillation feed stock through a restricted passage in a heating zone, further passing said feed stock after heating into a distilling zone characterized by maintenance of a succession of pools of liquid of composition varying from top to bottom of said distilling zone, continuously withdrawing residuum having substantial content of distillable fatty acids from a lower portion of said distilling zone, reheating said continuously withdrawn residuum having substantial content of distillable fatty acids by direct admixture with superheated steam of higher temperature than that of said withdrawn residuum, discharging the resultant mixture of superheated steam, residuum and distillable fatty acids into a higher portion of said distilling zone at a point below the point of liquid feed to said distilling zone having one or more pools of liquid intervening below the point of said discharge and above the point of residuum withdrawal of said distilling zone, passing the vapors of distillation into a condensing zone and condensing and removing the distilled fatty acids.

ALAN PORTER LEE.